Patented Oct. 24, 1939

2,177,494

UNITED STATES PATENT OFFICE 2,177,494

PROCESS OF PREPARING ALIPHATIC ACID ANHYDRIDES

Josef Lösch, Felix Walter, Heinrich Behringer, and Otto Schlöttig, Knapsack, near Cologne-on-the-Rhine, Germany, assignors to Aktiengesellschaft für Stickstoffdünger, Knapsack, near Cologne-on-the-Rhine, Germany No Drawing. Application November 15, 1935, Serial No. 50,002. In Germany November 16, 1933

28 Claims. (Cl. 260—546)

The present invention relates to a process of preparing organic acid anhydrides.

By the oxidation of an aldehyde with a gas containing oxygen or ozone in the presence or absence of a catalyst there could hitherto be obtained only the corresponding acid.

The present invention is based on the newly discovered fact that, when oxygen or ozone or gases containing oxygen or ozone or both are caused to act upon aliphatic aldehydes, the anhydrides of the corresponding acids may also be obtained. The formation of the anhydrides probably takes place according to the following equation:

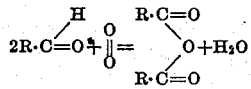

During the course of the process, hitherto usual for the preparation of carboxylic acids from the corresponding aldehydes, the anhydrides which may intermediarily be formed are converted into the acids by the rapid action of the water likewise formed during the process.

We have found that the anhydride formed during the course of the reaction defined above can easily be isolated. The invention firstly consists in the use of all steps for working up the products obtained by the action of oxidizing gases upon aliphatic aldehydes in a manner determined by the properties of the product, that is, in the use of all steps which are taken during the oxidation proper or as soon as possible after the oxidation to prevent or retard reaction between the anhydride and the water formed by the oxidation.

The invention, therefore, includes the elimination of the hydrolizing action of the water by union with a waterbinding agent; or the anhydride may be withdrawn from the action of the water by means of an organic solvent which substantially does not absorb any water. Furthermore, by rapidly cooling the product of the reaction, the velocity of hydrolysis is greatly retarded; by a rapid oxidation of the aldehyde used and prompt separation of the anhydride from the water, the time of contact between anhydride and water is reduced to material advantage.

We have furthermore found that certain catalysts are especially suitable for the production of anhydrides from the corresponding aldehydes. The invention, therefore, secondly consists in carrying out the process defined above in the presence of special catalysts. As such catalysts there may be mentioned copper and nickel metal and compounds of these metals, furthermore organic complex compounds of these metals and of cobalt. These catalysts considerably accelerate the reaction and, therefore, reduce the time of contact between anhydride and water; they seem, furthermore, to promote the formation per se of the anhydride. Frequently it becomes evident that the proportion of the metal or the compound thereof that is added affects the formation of anhydride in the sense that under otherwise equal conditions the increased addition of the metal or compound considerably increases the yield of anhydride, (whereas, for instance, during the oxidation of the aldehydes to form acids the yield is completely independent of the properties of the additional substance).

The steps, capable of preventing or retarding reaction between the anhydride and the water may be carried out in the following manner:

In order to avoid the water, formed during the oxidation, to decompose the anhydride formed it may be bound by waterbinding agents which are capable of binding only free water, for instance anhydrous copper sulfate, anhydrous gypsum, silicic acid gel (silicagel) etc. As solvents for the anhydride formed during the reaction there may be used, for instance, hydrocarbons, such as benzene, toluene, xylene, furthermore tetrachlorethane, trichlorethane, carbon tetrachloride, etc., which may dissolve anhydride but are unable to dissolve water.

It is suitable, after the formation of anhydride is complete, immediately to cool the reaction mixture to such temperatures as cause the reaction of the anhydride to acid practically to cease. If, for instance, acetic anhydride is prepared, the reaction mixture is immediately cooled to about −10° C.

As stated above, it is desirable to shorten the reaction between the aldehyde and the oxygen or the ozone. It is to be understood that the oxidizing agent is caused to act upon the aldehyde for a certain period which is not longer than about half the period necessary for oxidizing the aldehyde so as to obtain the acid. The more quickly the oxidation takes place, the greater is generally the yield of anhydride. The aim, therefore, is to shorten the period of oxidation as much as possible. The oxidation of acetaldehyde to form acetic acid in an industrial scale lasts for instance 8 to 20 hours (see for instance U. S. Patent No. 1,676,454, page 3, lines 32 and 82; German Patent No. 305,550, page 2, line 9 and British Patent No. 359,878, page 2, line 100). The apparatus used for this oxidation are provided with corresponding refrigerators with the aid of which it is possible to carry away the heat of the reaction which occurs. If there is attempted to transform into anhydride the aldehyde in these oxidizing apparatus in about one tenth of the time usually required for the preparation of carboxylic acid, it is impossible to render innocuous the reaction heat occurring in the unit of time and being nearly ten times as large. According to the present invention the duration of the reaction in the preparation of for instance acetic anhydride from acetaldehyde is shortened considerably more than one tenth of the hitherto usual period, (see, for instance Example 8, according to which the formation of the anhydride is complete in 14 minutes), so that in the unit of time the multiple of the reaction heat which hitherto occurred in the known processes of oxidizing aldehyde has to be carried away. In the present application the refrigerators must, therefore, likewise have a considerably larger cooling effect per unit of time.

The rapid separation of the anhydride from the water may be carried out in distilling columns, preferably at a reduced pressure, thereby carrying out the separation at temperatures as low as possible.

The reaction may be accelerated by the addition of suitable catalysts, preferably metals which are readily converted from one degree of valency into another, and compounds of these metals, for instance manganese, cobalt, lead, tin, zinc, uranium or the like, furthermore silver, the salts of the metals such as chlorides, nitrates, acetates, lactates, propionates, butyrates, carbonates, either alone or in admixture.

As metals which, besides the accelerating action, probably have also a specifically promoting effect on the formation of the anhydride there may be used copper, nickel, and the salts thereof such as nitrates, acetates, propionates, butyrates, lactates, carbonates, furthermore organic complex compounds such as copper-acetylaceton and nickel-acetylaceton. In this sense there act also the organic complex compounds of cobalt, such as cobalt-acetylaceton. These compounds may also be used in mixture, particularly there may be applied mixtures of cobalt salts with nickel and copper salts.

Each of these steps just described contributes in itself to a sufficient final yield of anhydride; if, however, several steps which assist the formation and preservation of the anhydride are used simultaneously, there may be attained, in certain cases, a further increase of the yield of anhydride. It is, for instance, easily possible to obtain a yield of more than 80 per cent. of the theory even in the case of readily saponifiable anhydrides of a low molecular weight, if a favorable additional substance and a sufficiently short period of oxidation are used. This yield can still be increased by the elimination of water or anhydride during the oxidation or by an immediate cooling of the reaction mixture after the oxidation.

As the components anhydride and water are transformed into acid more rapidly at a raised temperature than at a low temperature, it is suitable, when preparing anhydride from aldehyde, to apply not too high a temperature. The most favorable operating temperature varies according to the nature of the anhydride to be prepared. When acetic anhydride is prepared, it is advisable to apply a temperature which does not considerably exceed 50° C. When there are prepared anhydrides of a high molecular weight which in general decompose much more slowly with water, correspondingly raised operating temperatures may be applied.

As regards the ratio between the duration of the reaction and the operating temperature, a maximum of anhydride is obtained, under otherwise equal conditions, at the shortest duration of the reaction and a relatively low operating temperature. On the other hand, there may be obtained, under otherwise equal conditions, the same yield of anhydride at a short duration of the reaction and a raised operating temperature as at a prolonged duration of the reaction and a low operating temperature.

The aldehyde may be oxidized in the pure state or in solution in a suitable solvent, for instance the anhydride which is formed itself or the acid produced therefrom by hydrolysis with water. For the oxidation of the aldehydes there may be used gases containing oxygen, for instance air, or pure oxygen; the gases may also contain ozone.

Furthermore, the oxidation may be performed under ordinary or raised pressure.

The operation may be discontinuous or continuous. The production of anhydride is particularly promoted by a continuous operation.

According to the invention the anhydrides of all organic aliphatic monobasic carboxylic acids may be prepared of saturated acids as well as of unsaturated acids.

The following examples serve to illustrate the invention, but they are not intended to limit it thereto; the parts being by weight if not stated otherwise:

(1) 437 parts of oxygen are introduced for two hours, while stirring, into a stirring apparatus provided with refrigerators and charged with 300 parts of glacial acetic acid together with 1.2 parts of manganese acetate as an additional substance and 1200 parts of acetaldehyde. The operation is conducted at a temperature of 42° C. and at superatmospheric pressure. 15 per cent. of the aldehyde used are obtained in the reaction product in the form of acetic anhydride. The rest consists of acetic acid and water.

The reaction product is cooled, for instance to —10° C., and then conducted to a separating column wherein the anhydride is separated from the water at a reduced pressure. It is also possible to remove the water from the reaction product by means of a water-binding agent or to free the anhydride formed from the water by means of a solvent.

(2) 437 parts of oxygen are introduced within 30 minutes, while stirring, into a stirring vessel provided with refrigerators and charged with 300 parts of glacial acetic acid together with 1.2 parts of maganese acetate as additional substance and 1200 parts of acetaldehyde. The process is performed under a pressure of about 2 atmospheres above atmospheric pressure and at 42° C.

About 25 per cent. of the aldehyde used is obtained in the form of acetic anhydride. In comparison with the period of oxidation in Example 1, the formation of acetic anhydride is promoted by shortening the period of oxidation.

The reaction product is further treated in the manner described in Example 1.

(3) Into a stirring vessel provided with refrigerators and charged with 300 parts of glacial acetic acid together with 1.2 parts of manganese acetate as additional substance and 150 parts of anhydrous copper sulfate there are introduced in two hours, while stirring, 1200 parts of acetaldehyde and simultaneously 437 parts of oxygen. The pressure is about 2 atmospheres above atmospheric pressure and the temperature is at 25° C.

About 25 per cent. of the aldehyde used is obtained in the form of acetic anhydride. In comparison with the operating conditions in Examples 1 and 2, a hydrolysis of the anhydride is prevented by eliminating the water by means of anhydrous copper sulfate; consequently the same quantity of anhydride is obtained as in the case of the shortened period of oxidation.

(4) A stirring vessel provided with a refrigerator is charged with 70 parts of glacial acetic acid together with 1 part of manganese acetate and 3 parts of cobalt acetate as additional substance; 400 parts of acetaldehyde are added thereto. Oxygen is then introduced under a pressure of 2 atmospheres and at a temperature between 30° C. and 50° C. until the oxidation is complete. 30 per cent. of the acetaldehyde used is converted into acetic anhydride and the remainder into acetic acid.

The reaction product is further treated in the manner described in Example 1.

(5) The method of operating is the same as that described in Example 4. As additional substances there are used 2 parts of manganese acetate, 2 parts of cobalt acetate and 2 parts of nickel acetate. The yield amounts to 40 per cent. of anhydride.

The reaction product is further treated in the manner described in Example 1.

(6) The method of operating is the same as that described in Example 4. There are, however, introduced into the stirring vessel 80 parts of glacial acetic acid together with 1.5 parts of manganese acetate, 18 parts of cobalt acetate, 0.1 part of mercury acetate and 0.2 part of sodium acetate; 500 parts of acetaldehyde are added thereto. The yield amounts to 49 per cent. of anhydride.

The reaction product is further treated in the manner described in Example 1.

(7) The method of operating is the same as that described in Example 4. As additional substances there are used 2 parts of cobalt metal and 1 part of copper metal, both metals in a finely divided form. There are obtained 55 per cent. of the aldehyde in the form of anhydride.

The reaction product is further treated in the manner described in Example 1.

(8) A stirring vessel provided with a refrigerator is charged with 410 parts of acetic acid together with 2 parts of cobalt acetate and 6 parts of copper acetate; 200 parts of acetaldehyde are then added; under a pressure of 3 atmospheres and at a temperature of 42° C. an active current of oxygen is introduced so that the oxidation is complete in 14 minutes. 80.2 per cent. of the acetaldehyde used are transformed into acetic anhydride. The rest consists of acetic acid and water. The yield of mixed anhydride and acetic acid amounts to 99.5 per cent.

The reaction product is further treated in the manner described in Example 1.

(9) A mixture of 264 parts of acetaldehyde and 600 parts of glacial acetic acid wherein 6 parts of cobalt acetate have been dissolved is continuously introduced in the course of one hour into a reaction tower provided with suitable refrigerators; at the same time 96 parts of oxygen are continuously introduced, while thoroughly mixing. The oxidation occurs under ordinary pressure and at a temperature of about 44° C. 45.5 per cent. of the oxidized acetaldehyde are obtained in the form of anhydride.

The reaction product is cooled, for instance, to −10° C., and then conducted to a separating column wherein the anhydride is separated from the water under reduced pressure. It is also possible to remove the water from the reaction product by means of a water-binding agent or to free the anhydride formed from the water by means of a solvent.

(10) The method of working is the same as that described in Example 9, except that a pressure of 8 atmospheres is used and the oxidizing agent is air. As additional substances there are used 0.74 part of cobalt acetate and 0.74 part of nickel acetate. The yield amounts to 52 per cent. of the oxidized acetaldehyde in form of anhydride. The waste gas consists of substantially pure nitrogen.

The reaction product is cooled, for instance, to −10° C., and then conducted to a separating column wherein the anhydride is separated from the water under reduced pressure. It is also possible to remove the water from the reaction product by means of a water-binding agent or to free the anhydride formed from the water by means of a solvent.

(11) A mixture of 264 parts of acetaldehyde and 600 parts of glacial acetic acid is introduced continuously in the course of one hour into a reaction tower described in Example 9. 96 parts of oxygen which contains 3 grams of ozone per 100 liters of oxygen are simultaneously introduced, while intimately mixing. The oxidation occurs under ordinary pressure and at a temperature of 44° C. 5.4 per cent. of the oxidized acetaldehyde is obtained in the form of anhydride. If pure oxygen is used, the yield is somewhat inferior.

The reaction product is cooled, for instance, to −10° C., and then conducted to a separating column wherein the anhydride is separated from the water under reduced pressure. It is also possible to remove the water from the reaction product by means of a water-binding agent or to free the anhydride formed from the water by means of a solvent.

(12) A stirring vessel provided with a refrigerator is charged with 150 parts of propionic acid together with 1 part of manganese acetate, 3 parts of cobalt acetate and 1 part of copper acetate as additional substance; 300 parts of propionaldehyde are added thereto. A rapid current of oxygen is then introduced under a pressure of 2 atmospheres and at a temperature of 45° C. until the oxidation is complete. Duration: 40 minutes. 47 per cent. of the propionaldehyde used is transformed into propionic anhydride.

The reaction product is further treated in the manner described in Example 1.

(13) 30 parts of butyric acid together with 3 parts of cobalt acetate and 1 part of copper acetate as additional substance are introduced into a stirring vessel provided with a refrigerator. 500 parts of butyraldehyde are then added. Oxygen is introduced under a pressure of 2 atmospheres and at a temperature of 45° C. until the oxidation is complete. Duration: 30 minutes. 46 per cent. of the butyraldehyde used is transformed into butyric anhydride.

The reaction product is further treated in the manner described in Example 1.

(14) The method of operating is the same as that described in Example 4. Into a stirring vessel there are, however, introduced 200 parts of acetic acid as a solvent together with 6 parts of cobalt acetate and 2 parts of copper acetate. After the addition of 304 parts of oenanthic aldehyde of 94 per cent. strength, about 42 parts of oxygen are introduced at 54° C. in the course of 15 minutes. The process is operated under a pressure of about 2½ atmospheres. 64 per cent. of the theory of oenanthic anhydride are obtained.

The reaction product is further treated in the manner described in Example 1.

(15) The method of operating is the same as that described in Example 4. There are, however, introduced 300 parts of acetic acid as a solvent together with 6 parts of cobalt acetate and 2 parts of copper acetate. After the addition of 210 parts of crotonic aldehyde, oxygen is introduced at 30° C. and under a pressure of 2½ atmospheres so that the oxidation is terminated after about 6 hours. About 31 per cent. of the theory of crotonic anhydride are obtained.

The reaction product is further treated in the manner described in Example 1.

This application is a continuation-in-part of our co-pending application Serial No. 752,110, filed November 8, 1934.

We claim:

1. The process which comprises causing a gas selected from the group consisting of oxygen and ozone to oxidize an aliphatic aldehyde with the formation of the corresponding anhydride and isolating the anhydride thus formed.

2. The process which comprises causing a gas selected from the group consisting of oxygen and ozone to oxidize an aliphatic aldehyde with the formation of the corresponding anhydride, retarding reaction between the anhydride and the water also formed and isolating the anhydride.

3. The process which comprises causing a gas selected from the group consisting of oxygen and ozone to oxidize an aliphatic aldehyde with the formation of the corresponding anhydride, preventing reaction between the anhydride and the water also formed and isolating the anhydride.

4. The process which comprises causing a gas selected from the group consisting of oxygen and ozone to oxidize an aliphatic aldehyde with the formation of the corresponding anhydride, removing the water from the anhydride formed before such water has an opportunity to react with said anhydride to form substantial quantities of the corresponding acid and isolating the anhydride.

5. The process which comprises causing a gas selected from the group consisting of oxygen and ozone to oxidize an aliphatic aldehyde with the formation of the corresponding anhydride effecting such oxidation during a comparatively short interval of time, while strongly cooling, removing the water from the anhydride formed before such water has an opportunity to react with said anhydride to form substantial quantities of the corresponding acid and isolating the anhydride.

6. The process which comprises causing a gas selected from the group consisting of oxygen and ozone to oxidize an aliphatic aldehyde in the presence of a metal capable of being converted from one degree of valency into another with the formation of the corresponding anhydride, removing the water from the anhydride formed before such water has an opportunity to react with said anhydride to form substantial quantities of the corresponding acid and isolating the anhydride.

7. The process which comprises causing a gas selected from the group consisting of oxygen and ozone to oxidize an aliphatic aldehyde in the presence of a compound of a metal capable of being converted from one degree of valency into another with the formation of the corresponding anhydride, removing the water from the anhydride formed before such water has an opportunity to react with said anhydride to form substantial quantities of the corresponding acid and isolating the anhydride.

8. The process which comprises causing a gas selected from the group consisting of oxygen and ozone to oxidize an aliphatic aldehyde in the presence of a metal of the group consisting of copper, cobalt and nickel with the formation of the corresponding anhydride, removing the water from the anhydride formed before such water has an opportunity to react with said anhydride to form substantial quantities of the corresponding acid and isolating the anhydride.

9. The process which comprises causing a gas selected from the group consisting of oxygen and ozone to oxidize an aliphatic aldehyde in the presence of a compound of a metal of the group consisting of copper, cobalt and nickel with the formation of the corresponding anhydride, removing the water from the anhydride formed before such water has an opportunity to react with said anhydride to form substantial quantities of the corresponding acid and isolating the anhydride.

10. The process which comprises causing a gas selected from the group consisting of oxygen and ozone to oxidize an aliphatic aldehyde in the presence of an organic compound of cobalt with the formation of the corresponding anhydride, removing the water from the anhydride formed before such water has an opportunity to react with said anhydride to form substantial quantities of the corresponding acid and isolating the anhydride.

11. The process which comprises causing a gas selected from the group consisting of oxygen and ozone to oxidize an aliphatic aldehyde, removing the anhydride from the water formed by contacting the resulting oxidation products with an organic solvent capable of dissolving the anhydride and incapable of dissolving water.

12. The process which comprises causing a gas selected from the group consisting of oxygen and ozone to oxidize an aliphatic aldehyde, removing the water from the anhydride formed by contacting such water with an agent capable of binding free water.

13. The process which comprises causing a gas selected from the group consisting of oxygen and ozone to oxidize an aliphatic aldehyde, rapidly cooling the mixture after the reaction and isolating the anhydride.

14. The process which comprises causing a gas selected from the group consisting of oxygen and ozone to oxidize acetaldehyde, rapidly cooling the mixture after the reaction at temperatures of about −10° C. and isolating the acetic anhydride thus formed.

15. The process which comprises causing a gas selected from the group consisting of oxygen and ozone to oxidize acetaldehyde with the formation of acetic anhydride and isolating such anhydride.

16. The process which comprises causing a gas selected from the group consisting of oxygen and ozone to oxidize acetaldehyde with the formation of acetic anhydride, retarding reaction between the anhydride and the water also formed and isolating such anhydride.

17. The process which comprises causing a gas selected from the group consisting of oxygen and ozone to oxidize acetaldehyde with the formation of acetic anhydride, preventing reaction between the anhydride and the water also formed and isolating such anhydride.

18. The process which comprises causing a gas selected from the group consisting of oxygen and ozone to oxidize acetaldehyde with the formation of acetic anhydride, removing the water from the anhydride formed before such water has an opportunity to react with said anhydride to form substantial quantities of acetic acid and isolating such anhydride.

19. The process which comprises causing oxygen to oxidize acetaldehyde with the formation of acetic anhydride and isolating the latter from the other products of reaction.

20. The process which comprises causing oxygen to oxidize acetaldehyde with the formation of acetic anhydride, removing the co-formed water from the acetic anhydride before such water has an opportunity to react with the acetic anhydride to form substantial quantities of acetic acid and isolating the acetic anhydride.

21. The process which comprises causing oxygen to oxidize acetaldehyde with the formation of acetic anhydride, effecting such oxidation during a comparatively short interval of time while strongly cooling, removing the co-formed water from the acetic anhydride before such water has an opportunity to react with the acetic anhydride to form substantial quantities of acetic acid and isolating the acetic anhydride.

22. The process which comprises causing oxygen to oxidize acetaldehyde in the presence of an acetate of a metal of the group consisting of copper, cobalt and nickel with the formation of acetic anhydride, removing the co-formed water from the acetic anhydride before such water has an opportunity to react with the acetic anhydride to form substantial quantities of acetic acid, and isolating the acetic anhydride.

23. The process which comprises causing oxygen to oxidize acetaldehyde in the presence of a catalyst essentially comprising an acetate of manganese with the formation of acetic anhydride, removing the co-formed water from the acetic anhydride before such water has an opportunity to react with the acetic anhydride to form substantial quantities of acetic acid, and isolating the acetic anhydride.

24. The process which comprises causing oxygen to oxidize acetaldehyde in the presence of a catalyst essentially comprising an acetate of manganese and cobalt acetate with the formation of acetic anhydride, removing the co-formed water from the acetic anhydride before such water has an opportunity to react with the acetic anhydride to form substantial quantities of acetic acid, and isolating the acetic anhydride.

25. The process which comprises causing oxygen to oxidize acetaldehyde in the presence of a catalyst essentially comprising an acetate of manganese and nickel acetate with the formation of acetic anhydride, removing the co-formed water from the acetic anhydride before such water has an opportunity to react with the acetic anhydride to form substantial quantities of acetic acid, and isolating the acetic anhydride.

26. The process which comprises causing oxygen to oxidize acetaldehyde with the formation of acetic anhydride, removing the co-formed water from the acetic anhydride before such water has an opportunity to react with the acetic anhydride to form substantial quantities of acetic acid, said removal being effected by contacting the formed water-anhydride mixture with a dehydrating metal salt and isolating the acetic anhydride.

27. A process of obtaining acetic anhydride which comprises passing oxygen into acetaldehyde in presence of an oxidation catalyst under superatmospheric pressure while maintaining a temperature of about 42° C. with production of acetic anhydride and water; and, when a desired concentration of acetic anhydride is present, cooling the reaction mixture and separating the water and anhydride from each other and from the other components of the reaction mixture.

28. A process of obtaining acetic anhydride which comprises passing oxygen into acetaldehyde in presence of an oxidation catalyst and a dehydrating agent under superatmospheric pressure with production of acetic anhydride and water; and, when a desired concentration of acetic anhydride is present, separating the acetic anhydride from the other constituents of the reaction mixture.

JOSEF LÖSCH.
FELIX WALTER.
HEINRICH BEHRINGER.
OTTO SCHLÖTTIG.